April 12, 1966      K. W. SCOTT      3,245,452

QUIET AND SOFT RIDE PNEUMATIC TIRE

Filed July 11, 1962      5 Sheets-Sheet 1

*INVENTOR.*
KENNETH W. SCOTT

BY

*R. L. Miller*
ATTORNEY

April 12, 1966  K. W. SCOTT  3,245,452
QUIET AND SOFT RIDE PNEUMATIC TIRE
Filed July 11, 1962   5 Sheets-Sheet 2

INVENTOR.
KENNETH W. SCOTT
BY
*R. L. Miller*
ATTORNEY

GUM STOCKS

HETEROGENEOUS
BLEND OF TWO
POLYMERS

FIG. 7

GUM STOCKS

3 HETEROGENEOUS
PHASES RESULTING
FROM BLENDING
3 POLYMERS

FIG. 8

INVENTOR.
KENNETH W. SCOTT
BY
ATTORNEY

FIG. 9

EFFECT OF OIL ON HETEROGENEOUS BLEND OF 2 POLYMERS (50/50 BLEND)

FIG. 10

United States Patent Office 3,245,452
Patented Apr. 12, 1966

3,245,452
QUIET AND SOFT RIDE PNEUMATIC TIRE
Kenneth W. Scott, Cuyahoga Falls, Ohio, assignor to The Goodyear Tire & Rubber Company, Akron, Ohio, a corporation of Ohio
Filed July 11, 1962, Ser. No. 216,696
11 Claims. (Cl. 152—330)

This is a continuation-in-part application of my application Serial Number 795,465, filed February 25, 1959.

This invention relates to a pneumatic tire made of an improved rubber composition which imparts improved soft and quiet ride properties to a motor vehicle as is experienced by one riding in the motor vehicle equipped with these improved tires.

Figures 1, 2:
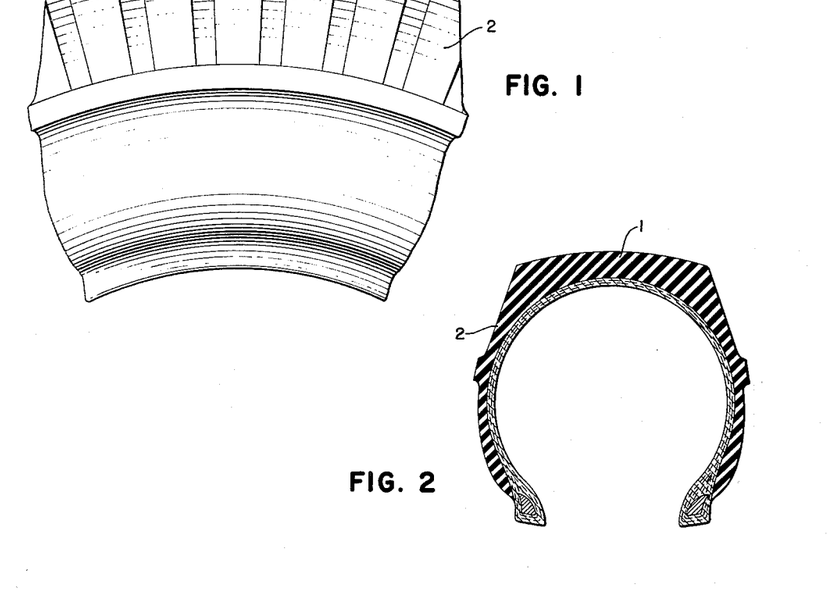

The riding qualities of a pneumatic tire depend upon the construction of the tire, the properties of the materials used in the construction of the tire, and the conditions of inflation under which the tire is operated. With regard to the materials of construction, it is known that the viscous and elastic properties of the rubber portion of the tire, shown for example in FIGS. 1 and 2 of the drawing, particularly in the tread 1 and also in the wall portions 2, affects the riding quality of the tire. Hereinafter the properties of viscosity and elasticity will be collectively referred to by the general term "viscoelastic" properties. The visco-elastic properties of a rubber may be characterized by measuring the elastic properties and the viscous properties of the rubber over a range of frequencies and temperatures. The viscous properties of a rubber may be described in any one of a number of ways including hysteresis, internal friction, damping, mechanical loss factor, resilience, etc. The elastic properties of a rubber may be described in any one of a number of ways including shear modulus, dynamic modulus, compliance, stiffness, etc.

A rubber having desirable quiet and soft ride properties when used on the tread portion of a pneumatic tire is butyl rubber. However, because of the severe stresses and strains produced in a pneumatic tire at high speeds of travel, butyl rubber treads are not practical for many reasons, including poor treadwear, poor road stability and response, severe low-temperature flat spotting, and also the difficulties encountered in the utilization of butyl rubber in the construction of the pneumatic tire.

It has now been discovered that a pneumatic tire tread composition imparting improved riding qualities to the tire can be produced by heterogeneously blending at least two different polymeric materials, one polymeric material having a stiffening temperature between —30° C. and 15° C. and at least 20° C. higher than the stiffening temperature of another of the polymeric materials. Although it has been observed that soft and quiet ride properties may be developed using rubbery compositions containing polymeric materials having stiffening temperatures above 15° C., pneumatic tires made therefrom possess certain undesirable properties, particularly when used under normal conditions, not found in tires made from the composition of the present invention.

Of the various rubbery polymers useful in the manufacture of a pneumatic tire, only butyl rubber is known to have the viscoelastic properties which produce a certain quality of soft and quiet ride when used in the tread portion of the tire. By butyl rubber is meant the rubbery copolymer resulting from the low temperature polymerization of a mixture comprising preferably from 95 to 99% by weight of an isomonoolefin, such as isobutylene, and from 1 to 5% of a diolefin, such as isoprene or butadiene-1,3. The copolymerization may be effected by the usual method of copolymerizing such monomers as disclosed in detail in United States Patents 2,356,128; 2,356,-129; and 2,356,130.

Figure 3:
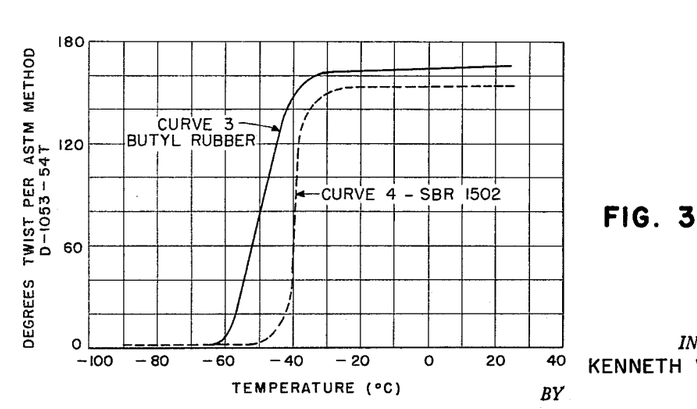
Figure 4:
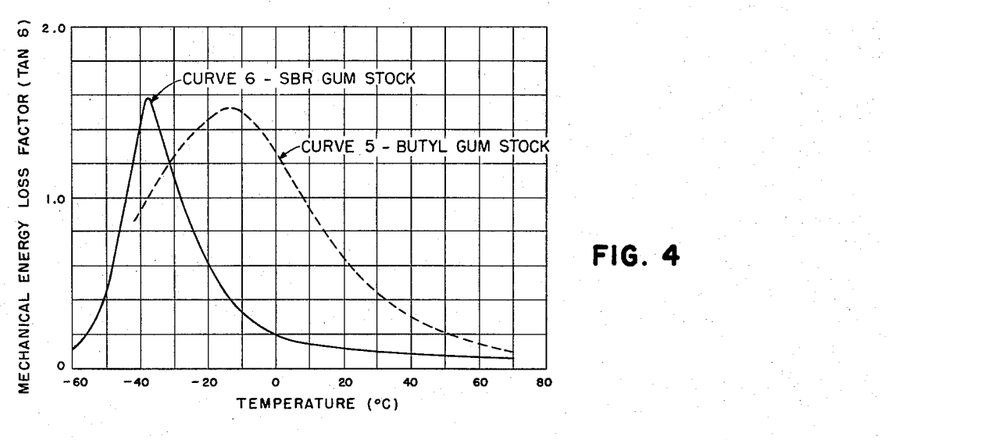

A comparison of the viscoelastic properties of butyl rubber gum stock and gum stock of a copolymer of 76.5% butadiene and 23.5% styrene, now commonly referred to in the rubber industry as SBR-1502, is shown in FIGS. 3 and 4 of the drawing. FIG. 3 shows how elastic properties for butyl rubber (curve 3) and SBR-1502 (curve 4) vary with temperature when measured by the Gehman Torsion Apparatus (ASTM D 1053-54T). FIG. 4 shows how the mechanical energy loss factor measured at a strain frequency of 40 cycles per second varies with temperature for butyl gum (curve 5), as reported by S. DeMeij and G. J. Van Amerongen in Kautschuk u. Gummi 9, 56WT (1956), and for an SBR (curve 6), as reported by L. J. Zapas, S. L. Shufler, and T. W. De Witt in "Reconstruction Finance Corporation Report CR–3334" for July 10, 1953. The butyl rubber curve 3 indicates a more gradual change in the elastic properties for the butyl rubber which extends over a temperature range of from —60° C. to about —35° C., whereas the SBR curve 4 shows a more abrupt change in the elastic properties of SBR in that the abrupt change takes place in a temperature range of from about —45° C. to about —35° C. or only 10°. Since butyl rubber does produce a certain quality of quiet and soft ride when used in a pneumatic tire but possesses the many disadvantages noted above, it becomes desirable to develop a new rubber composition having viscoelastic properties similar to butyl rubber as expressed by curves 3 and 5 but not having the disadvantages of butyl. It is also to be observed that the butyl rubber is significantly more flexible at the higher temperature than is SBR, a property highly desirable in the development of pneumatic tires having quiet and soft ride characteristics.

With reference to FIG. 4, the mechanical energy loss factor as represented by tangent delta for SBR (curve 6) peaks within a very narrow temperature range, whereas the same value for butyl rubber (curve 5) peaks over a much wider temperature range. The same abrupt changes in viscoelastic properties for SBR are also observed for other polymers. The temperatures at which these abrupt changes in viscoelastic properties occur are directly related to the stiffening temperature of the polymer under consideration.

For the purposes of this invention the stiffening temperature of a polymer is to be defined as the temperature corresponding to the inflection point of the curve as developed in accordance with ASTM test method D 1053–54T.

It has been established that all other investigated rubbery polymers have curves whose shapes are extremely close to GR–S except that the position of the curves for the other polymers will be centered on different stiffening temperatures. Butyl rubber is the only known rubber polymer whose viscoelastic properties are spread out over a wide temperature range, and therefore has no sharp or definite stiffening temperature range.

It now has been discovered that heterogeneous blends of at least two different polymers, one of which has a stiffening temperature not higher than 15° C. nor less than about −30° C. and at least 20° C. higher than the stiffening temperature of another of said polymers, possess viscoelastic properties which permit their use in the manufacture of a pneumatic tire having quiet and soft ride properties as is experienced by one riding in a motor car equipped with these tires.

Figure 5:
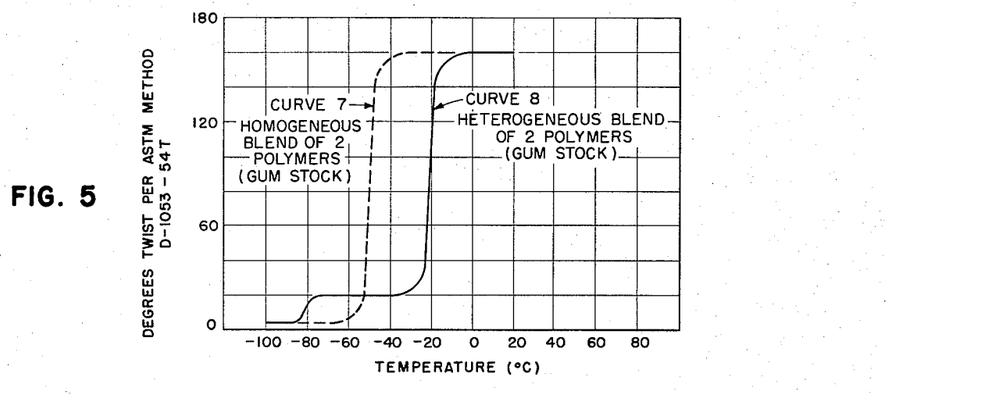

It has been observed that desirable viscoelastic properties are not present in a blend of at least two different polymeric materials when the blend is made in such a manner as to produce a homogeneous mixture as shown for example in FIG. 5, which is a graphic representation of the critical difference between blends that are homogeneous in nature and blends that are heterogeneous in nature. Curve 8 is the result of data obtained by the ASTM method D 1053–54T made on a heterogeneous blend of approximately equal amounts of a polymer having a stiffening temperature of −80° C. and another polymer having a stiffening temperature of −20° C., whereas compatible components having the same stiffening temperatures, when blended in such a way as to produce a homogeneous mixture, produce data as represented by curve 7, thus indicating that the viscoelastic properties of the homogeneous blend are no better for building a pneumatic tire having soft and quiet ride properties than is GR–S as may be determined from curve 4 in FIG. 3.

Figure 6:
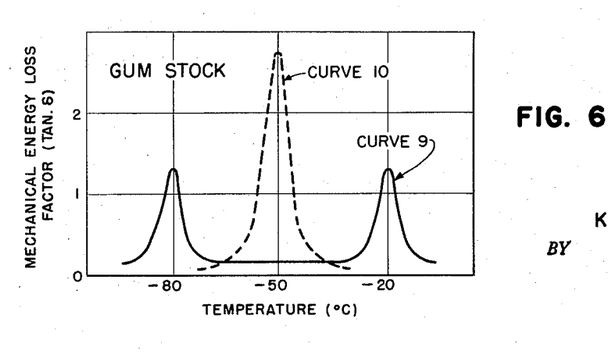

FIG. 6 shows the mechanical energy loss factor of the same compositions of FIG. 5 wherein the heterogeneous blend produces two separate and widely separated peaks in curve 9, whereas a single sharp peak is produced when the same values are measured for the homogeneous blend as shown by curve 10. Thus, it may be observed that FIGS. 5 and 6 show that for heterogeneous systems the inflection points of FIG. 5 and the regions of maximum mechanical loss factor occur approximately at the stiffening temperature of the separate components existing in the blend. Thus, a desirable region of elastic properties exists over a broad temperature range of from −90° C. to −10° C. as shown by curve 8 and a similar desirable mechanical energy loss factor range exists over a similar broad temperature range as shown by curve 9.

It has also been observed that the magnitude of these effects depends on the amount of each component present. When these components are blended into a homogeneous mixture, then these regions of broad viscoelastic properties are lost and only the stiffening temperature is affected by changes of composition in the blend.

Figure 7:
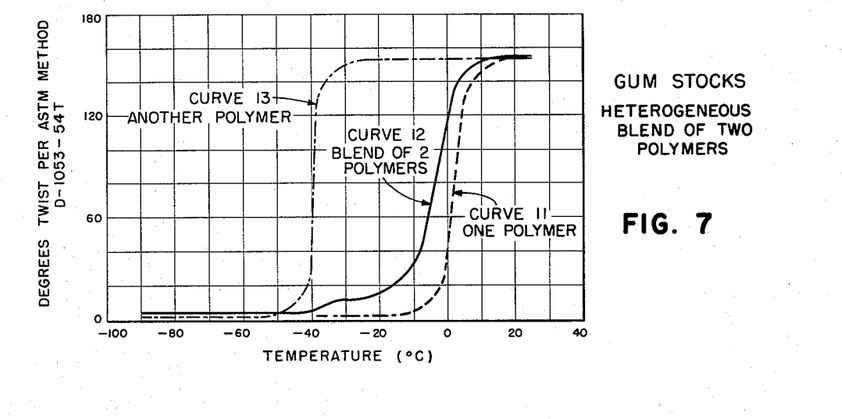

FIG. 7 represents the results of heterogeneous blends of incompatible components using a rubber having a stiffening temperature of about 2° C. as shown by curve 11 and another rubber with a stiffening temperature of about 41° below that of the first rubber and having a value of −39° C. as shown by curve 13. Curve 12 is produced when these two rubbers are blended into a heterogeneous mixture and tested as above.

Thus, it has been observed that the broad viscoelastic properties of butyl rubber may be approached by properly blending a rubbery polymeric composition having a stiffening temperature at least 20° greater than another polymeric composition and preferably neither composition having a stiffening temperature exceeding about 15° C.

In this invention the term "heterogeneous blend of rubbers" means that the molecular motions of different types of molecules or the viscoelastic properties of phases of different compositions are essentially independent of each other. This definition is in contrast to the definition of a "homogeneous blend of rubbers" which means a single phase of different types of molecules in which the molecular motions or viscoelastic properties of the different types of molecules are strongly dependent on the presence of each other. The usual interpretation of the term "heterogeneous blend of rubbers" will be that, after blending of rubbers and compounding ingredients and subsequent vulcanization, there will exist two or more separate physical phases of rubbery composition. The composition of these rubbery phases will determine the stiffening temperatures of these rubbery phases. This invention also indicates the restrictions on the stiffening temperatures of these phases required for the use of these heterogeneous blends of rubbers for quiet riding tires. A convenient working definition and test for heterogeneity in rubber blends is based on ASTM test method D 1053–54T which uses the Gehman Torsional Apparatus. This method yields data which when plotted as twist angle versus temperature yields curves similar to curve 8 of FIG. 5, if the stiffening temperatures of the heterogeneously blended polymers are sufficiently different; while homogeneous blends will yield only a single dispersion region with a steep slope as shown by curve 7 as do single polymeric species as shown by curves 4, 11, and 13. This behavior is most easily noted for gum vulcanizates of blends containing 30% of the rubber with the higher stiffening temperature and 70% of another rubber whose stiffening temperature is at least 20° C. lower. When these blends are compounded with ingredients normally used in making tread stock, such as carbon black, oil, etc., the changes in viscoelastic properties become less abrupt, thereby producing a smoother curve, as shown for example by curve 20 of FIG. 9 in contrast to curve 12 of FIG. 7 which represents the gum vulcanizate of this blend. However, the compounded blend possesses the necessary property of heterogeneity.

In heterogeneous blends of rubbers the viscoelastic properties of the blend will depend on the composition of the phases existing in the blend. In many such blends the rubbers will be essentially insoluble in each other so that the viscoelastic properties of the blend will depend directly on the viscoelastic properties of the rubbers blended. In certain blends, particularly those containing large amounts of oil, one or more of the rubbers blended will be partially soluble in one or more of the other rubbers. In these cases the viscoelastic properties of the heterogeneous blend of rubbers will depend directly on the viscoelastic properties of the compositions existing in the separate phases. Since the viscoelastic properties of a phase are strongly dependent on the stiffening temperature of the phase, we may expect compositional changes, such as the addition of oil or other rubbers partially soluble in the phase to change the stiffening temperature of the phases and, therefore, to have a marked effect on quiet ride properties of the blend. Although reference is made at times to the viscoelastic properties of the rubbers blended, the viscoelastic properties of the phases after blending and compounding of the separate components determine the final qualities of soft and quiet ride in a pneumatic tire.

Figure 8:
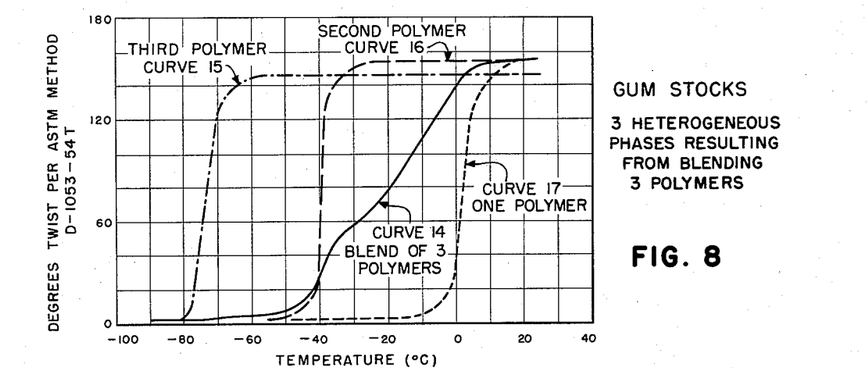

Although quiet and soft ride properties are found in a tire having a tread made of two polymeric components having stiffening temperatures preferably not greater than 15° C. and having their stiffening temperatures at least 20° apart and being blended into a heterogeneous mixture, quiet and soft ride properties are also developed when more than two different polymeric components are used. For example, curve 14 of FIG. 8 represents desirable viscoelastic properties possessed by a heterogeneous mixture containing three components which is composed of approximately equal parts of polybutadiene resulting from the free radical emulsion polymerization of butadiene, the polybutadiene having a stiffening temperature of −74° C. as shown by curve 15, a rubbery copolymer of butadiene and styrene resulting from the free radical emulsion polymerization of a mixture containing 75 parts of butadiene and 25 parts of styrene and having a stiffening temperature of −40° C. as shown by curve 16, and a copolymer of butadiene and styrene resulting from the free radical emulsion polymerization of a mixture containing 45 parts of butadiene and 55 parts of styrene and having a stiffening temperature of 2° C. as shown by curve 17. An even broader spectrum of values may be obtained if in the blend, as shown by curve 14, one substitutes an all 1,4 addition form of polybutadiene having a stiffening temperature of −105° C. for the polybutadiene containing a mixture of 1,2- and 1,4 addition forms of polybutadiene which results from the free radical emulsion polymerization of butadiene. Thus, the present invention involves particularly the use of a heterogeneous mixture comprising two or more components, each having stiffening temperatures different from the other and at least two of which have stiffening temperatures separated from each other by at least 20° C., in each instance the particular number of components to be used will depend upon the end use to which the blend is to be put and the particular properties desired.

When two or three components are to be blended together into a heterogeneous mixture, the problem of blending is easily solved by merely mechanically mixing two or more different polymers that have been separately prepared. However, when more than three components are to be blended, it becomes more difficult from a production standpoint. One method of producing such a heterogeneous mixture employing a large number of butadiene/styrene polymers is to first add to a polymerization vessel all of the butadiene component that is to be used in making the various butadiene/styrene copolymers and partially causing the polymerization of the butadiene thereby forming polybutadiene. A small amount of styrene is then added to the resulting mixture, thus producing a system rich in butadiene and poor in styrene, and continuing the polymerization to form a high butadiene low styrene copolymer. The remainder of the styrene is added incrementally over a period of time until the system finally becomes rich in styrene component and poor in butadiene component. The final polymeric composition may have substantial amounts of molecules of all compositions between polybutadiene and copolymers thereof with styrene ranging from 99 parts of butadiene and 1 part of styrene to 99 parts of styrene and 1 part of butadiene. Thus, it is observed that a great many different polymers can be made, each having different stiffening temperatures, many of which are at least 20° C. apart. The final product will possess broad butyl-like viscoelastic properties.

Figure 11:
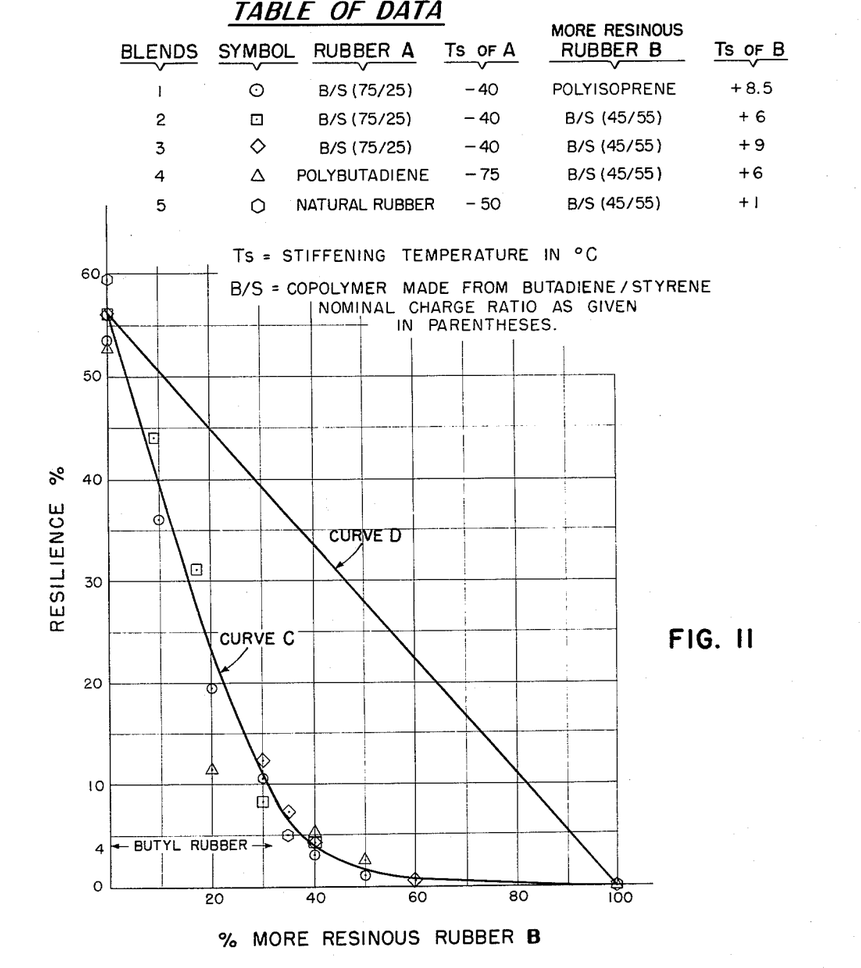

The components used in making a heterogeneous system having uniformly broad viscoelastic properties depends on the proportions of each component present, as clearly shown by FIG. 11 of the drawing. In FIG. 11, Curve C shows the relationship between the amount of resinous polymeric component, referred to in the table of data as Rubber B, having a stiffening temperature between −30° C. and 15° C. in a heterogeneous blend with a rubbery polymeric component, referred to in the table of data as Rubber A, having a stiffening temperature 20° C. lower than the stiffening temperature of the resinous polymeric component B and percent resilience of the blend when measured on the Vibrotester instrument in accordance with the article by S. D. Gehman, D. E. Woodford and R. B. Stambaugh, appearing in Ind. Eng. Chem., 33, 1032 (1941). Curve D represents what one skilled in this art would expect to obtain. Referring to the table of data in FIG. 11, each of the rubbery components A and each of the more resinous rubbery components B were prepared in substantial accordance with the procedure disclosed in Example 1 below with the exception that polyisoprene was prepared in the presence of a catalyst for the anionic polymerization of isoprene, and natural rubber was *Hevea brasiliensis*. The components A and B were blended in substantially the same manner described in Example 1 with the exception that no carbon black and no mineral oil were used. Rubber A in blends 1, 2 and 3 was made by polymerizing 75 parts of butadiene-1,3 with 25 parts of styrene in a conventional manner using an aqueous emulsion technique. The table of data shows the stiffening temperatures of each rubber component A and B in blends 1, 2, 3, 4 and 5. It is observed that the dynamic modulus of these blends set forth in FIG. 11 increases by only 40–100% as the amount of Rubber B in the blend is increased from 0% to 60%. The dynamic modulus of Rubber B alone is too high to measure on the Vibrotester instrument. However, from other measurements of the dynamic modulus of Rubber B alone, values of 200–1000% higher than that of Rubber A can be obtained. It is found that pneumatic tire treads made entirely of Rubber B are unsuitable for the production of a quiet and soft ride tire because Rubber B is too stiff in terms of dynamic modulus. For commercially practical pneumatic tires having a quiet and soft ride quality, it has been discovered that the upper limit for Rubber B in a blend with Rubber A is about 80%. It has also been found that the present standard of soft and quiet ride quality in a pneumatic tire is produced by butyl rubber whose gum stock has a percent resilience of 4 or less when measured in the manner described for the values set forth in FIG. 11. It has been observed that the same percent resilience of 4 or less may be produced when at least 40 parts of Rubber B is blended with 60 parts of Rubber A to form a heterogeneous mixture of the two rubbers. This ratio of Rubber B to Rubber A is considerably different from the ratio found from Curve D, which requires the presence of at least 93% of Rubber B and 7% of Rubber A in order to produce a blend having a percent resilience of not more than 4.

This invention emphasizes the importance to quiet and soft ride tire application of heterogeneously blending two or more polymers whose stiffening temperatures must meet certain requirements described above. When selecting a number of polymers from a large group for use in quiet and soft ride tire applications, sometimes the necessary stiffening temperature data will not be available. In such cases it may be feasible to approximate stiffening temperatures by other measurements. An article by Dr. G. S. Trick published in Journal of Applied Polymer Science 3, 253 (1960), has shown that the dilatometrically determined glass transformation temperature of a large variety of polymers is 10 to 20° C. (averaging about 15° C.) lower than the corresponding stiffening temperature of these polymers provided the curve obtained by ASTM test method D 1053–54T on these polymers has the usual steepness similar to that shown by SBR–1502 polymer in curve 4 of FIG. 3. This rule using the 15° C. correction term may be used with glass transformation temperature data to approximate the stiffening temperature of a polymer. The use of this rule may be illustrated in the case of butadiene/styrene copolymers prepared by emulsion polymerization at 5° C.

The effect of the styrene content in any particular butadiene/styrene copolymer on its glass transformation temperature may be observed from information reported by L. A. Wood in Journal of Polymer Science, 28, 319 (1958), particularly as shown by FIG. 2 on page 323 thereof. Thus, for example, a copolymer of butadiene and styrene having a stiffening temperature of 3° C. will contain 55% styrene monomer and 45% butadiene in the copolymer and this resin then may be blended with a butadiene/styrene copolymer having a stiffening temperature of −40° C., which the curve indicates to be a copolymer containing 25 parts of styrene and 75 parts of butadiene. These stiffening temperatures approximated from Wood's data are in excellent agreement with measured values determined from curves 11 and 13 of FIGURE 7.

With respect to the materials that may be blended into a heterogeneous composition, it has been observed that those materials made by reacting a conjugated diene hydrocarbon with styrene produce desirable results.

It has been further observed that when copolymers of a conjugated diene hydrocarbon, for example butadiene-1,3, and a vinyl aromatic compound, such as styrene, are used, it is preferred that one copolymer be made using a minor amount of styrene and the other copolymer be made with a larger amount of styrene.

By a minor amount of styrene is meant amounts from about 1 to 40 parts per 100 parts of monomer used when making the rubbery component of the blend having the lower stiffening temperature. The other component of the blend will have an amount of styrene from 32 parts up to 62 parts per 100 parts of monomer used. For purposes of convenience the copolymers made using 1 to 40 parts of styrene may be referred to as "rubbery" polymers and the copolymers made using from 32 to 62 parts of styrene are less rubbery as a class of polymers than the "rubbery" polymers and therefore may be referred to as "resinous" polymers. From these groups of "rubbery" and "resinous" polymers may be selected two or more polymers which when used in the construction of a pneumatic tire will produce quiet and soft ride properties as shown in Example 1.

The following example illustrates the present invention wherein desired qualitites of quiet and soft ride may be produced in a pneumatic tire having a tread made of a composition of the type disclosed below, all parts being by weight unless otherwise identified.

EXAMPLE 1

The following principal ingredients are used in making a pneumatic tire tread stock for the improved pneumatic tire of this invention:

| | Parts |
|---|---|
| SBR–1710 (The product resulting from free radical polymerization in emulsion at 41° F. of a mixture of monomers to produce a rubbery copolymer having 76.5 parts of butadiene-1,3 and 23.5 parts of styrene and having a stiffening temperature of −40° C. and containing 37.5 parts per 100 parts of rubber hydrocarbon of mineral oil SPX97 sold by Shell Oil Company.) | 68.75 |
| Resinous copolymer (The product resulting from free radical polymerization in emulsion at 41° F. to 100% conversion of a mixture of monomers to produce a resinous copolymer having 47 parts of butadiene-1,3 and 53 parts of styrene and having a stiffening temperature of 1° C. and a Mooney value of 66ML–4.) | 50.00 |
| Carbon black (abrasive furnace black) | 68.00 |
| Processing mineral oil (PM–100 sold by Sinclair Oil Corporation) | 25.00 |

The SBR–1710 and the resinous copolymer are added to a Banbury mixer and broken down for a period of one minute, after which the carbon black and other dry compounding ingredients, such as antioxidants, i.e. 1 part of phenyl beta naphthylamine, and cure activators, i.e. 2 parts of stearic acid and 3 parts of zinc oxide, are added and blended into a mixture until the mass reaches a temperature of 280° F. at which time the oil is added and the mixing continued until the mass reaches a temperature of 325° F. The resulting blend is then combined with curing agents, such as sulfur 2 parts, and accelerators of cure, such as Altax (benzothiazyl disulfide) 0.85 part, and diphenyl guanidine 0.70 part, and extruded through a tread-forming die. A pneumatic tire is then built and cured in accordance with conventional methods having the tread portion made of the rubber described above.

Although a soft ride tire may be made of the ingredients set forth in Example 1 above, other rubbers, particularly butadiene-1,3 containing at least 75% cis-1,4 structure, may be used in place of the rubbery copolymer of butadiene and styrene used in Example 1 and other resins may be used other than the resinous copolymer of butadiene and styrene used in Example 1 so long as the stiffening temperature of the rubber and the resin is not more than 15° C. and so long as there is a difference of at least 20° between the stiffening temperatures of the blend of rubber and resins being used and so long as the rubbers and resins being blended are blended into a hetergeneous mass in contrast to a homogeneous mass.

One or more "rubbery" polymers may be selected from the following list of "rubbery" polymeric compositions and used in combination with one or more "resinous" polymers selected from the list of "resinous" polymeric compositions, provided each polymeric composition used has a stiffening temperature not greater than 15° C., at least two of the polymeric compositions have stiffening temperatures at least 20° C. apart, and the polymeric components are "heterogeneously" blended as defined above:

"Rubbery" polymers

I. Homopolymers:

Natural Rubber.
Polybutadiene-1,3 with at least 30% 1,4 structure, the remainder being 1,2 structure.
Polybutadiene-1,3 with at least 75% cis-1,4 structure.
Poly(2-alkyl butadiene-1,3) polymers.
Poly(2-ethyl butadiene-1,3).
Conjugated diolefin polymers.
2,3-dimethyl butadiene-1,3 polymer.
Polyvinyl n-alkyl ethers, the alkyl group having 1 to 12 carbon atoms.
Polyvinyl n-butyl ether.
Polyalkyl acrylates, the alkyl group having 2 to 18 carbon atoms.
Silicone rubbers or polysiloxanes.
Polyisoprene having at least 30% 1,4 structure.
Polyalkyl methacrylate, the alkyl group containing 8 to 18 carbon atoms.
Poly p-alkyl styrenes, the alkyl group containing 6 to 18 carbon atoms.
Polychloroprene.
Aliphatic polyesters.
Poly alkylene sulfides—amorphous type.
Poly alkylene oxides—amorphous type.
Aliphatic polyurethanes—amorphous type.
Aliphatic polyamides—amorphous type.
Poly 2-fluorobutadiene-1,3.
Poly α-olefins, the α-olefin containing 4 to 18 carbon atoms.
Polymerized compounds containing a single olefinic double bond.

IIa. Interpolymers made from the following monomers combined in the ratios indicated by weight:

| | |
|---|---|
| Butadiene/acrylonitrile | 99/1 to 50/50. |
| Isoprene/styrene | 99/1 to 50/50. |
| Butadiene/styrene | 99/1 to 51/49. |
| Conjugated diolefin/ vinyl n-alkyl ether | 99/1 to 1/99, alkyl group having 1 to 12 carbon atoms. |
| Conjugated diolefin/ n-alkyl acrylate | 99/1 to 1/99, the alkyl group having 2 to 18 carbon atoms. |
| Conjugated diolefin/ methyl acrylate | 99/1 to 29/71. |
| Conjugated diolefin/α-olefin | 99/1 to 1/99, the α-olefin comonomer having 4 to 18 carbon atoms. |

| Polymer system | Ratio |
|---|---|
| Conjugated diolefin/propylene | 99/1 to 5/95. |
| Conjugated diolefin/ethylene (A)/α-olefin(B) | 99/0/1 to 1/A/B A+B=99 and the α-olefin comonomer having 3 to 18 carbon atoms. |
| Conjugated diolefin/ethylene | 99/1 to 1/99. |
| Conjugated diolefin/acrylonitrile | 99/1 to 51/49. |
| Butyl acrylate/styrene | 99/1 to 73/27. |
| Conjugated diolefin/n-alkyl acrylate(A)/styrene(B) | 99/1/0 to 1/A/B, where B is less than 50 and A+B=99, and the alkyl group has 1 to 18 carbon atoms. |
| Ethylene/α-olefin | 80/20 to 1/99 and the α-olefin comonomer having 3 to 18 carbon atoms. |
| Mixture of two different α-olefins | 99/1 to 1/99 and the α-olefin comonomers having 3 to 18 carbon atoms. |
| Conjugated diolefin/styrene | 99/1 to 50/50. |
| Conjugated diolefin/vinyl carboxylate | 99/1 to 1/99, the carboxylate group having 6 to 18 carbon atoms. |
| Conjugated diolefin/vinyl acetate | 99/1 to 50/50. |
| Conjugated diolefin/vinyl propionate | 99/1 to 35/65. |
| Conjugated diolefin/vinyl butyrate | 99/1 to 25/75. |
| Conjugated diolefin/n-alkyl methacrylate | 99/1 to 1/99, the alkyl group having 4 to 18 carbon atoms. |
| Conjugated diolefin/methyl methacrylate | 99/1 to 65/35. |
| Conjugated diolefin/ethyl methacrylate | 99/1 to 55/45. |
| Conjugated diolefin/acrylic acid | 99/1 to 65/35. |
| Conjugated diolefin/styrene (A)/acrylic acid (B) | 99/1/0 to 50/A/B where A+B=50. |
| Vinylidene fluoride/chlorotrifluoroethylene | 100/0 to 68/32. |
| Conjugated diolefin/vinylidene fluoride(A)/chlorotrifluoroethylene(B) | 98/1/1 to 1/A/B where A+B=99 and B is less than 40. |
| Conjugated diolefin/acrylonitrile(A)/styrene(B) | 98/1/1 to 50/A/B where A+B=50. |
| Conjugated diolefin/acrylonitrile(A)/acrylic acid(B) | 98/1/1 to 50/A/B where A+B=50. |
| Conjugated diolefin/arylvinyl compound | 99/1 to 50/50. |
| Vinylidene fluoride/tetrafluoroethylene | 99/1 to 1/99. |
| Conjugated diolefin/vinylidene chloride | 99/1 to 1/99. |
| Conjugated diolefin/vinyl chloride | 99/1 to 40/60. |
| Conjugated diolefin/methacrylonitrile | 99/1 to 55/45. |
| Conjugated diolefin/methacrylic acid | 99/1 to 50/50. |
| Conjugated diolefin/acrylonitrile(A)/methacrylic acid(B) | 98/1/1 to 50/A/B where A+B=50. |
| Conjugated diolefin/styrene (A)/methacrylic acid(B) | 98/1/1 to 50/A/B where A+B=50. |
| Butadiene/2-methyl-5-vinyl pyridine | 99/1 to 60/40. |
| Conjugated diolefin/vinyl pyridine | 99/1 to 50/50. |
| Conjugated diolefin/isobutylene(A)/arylvinyl(B) | 98/1/1 to A/B/50 where A+B=50. |
| Conjugated diolefin/copolymerizable compound containing a single olefinic double bond | 99/1 to 1/99. |

IIb. Interpolymers:

Copolyamides.
Copolyesters.
Copolyalkylene sulfides.
Copolyalkylene oxides.
Copolyurethanes.
Polysulfide rubbers of the "Thiokol'" type.
Diisocyanate extended polyesters, polyethers or polyamides.
Diamine or glycol extended reaction products of phosgene and a polyester, polyether or polyamide.
Copolysiloxanes.

The compositions listed above having a conjugated diolefin as one of the monomers are approximate and vary depending on the exact nature of the conjugated diolefin; the particular ratios given are particularly with respect to the use of butadiene-1,3.

The following "resinous" polymeric compositions may be used with any one of the foregoing "rubbery" polymeric materials as long as the necessary values concerning stiffening temperature for each of the components is observed and the polymeric components are heterogeneously blended.

*"Resinous" polymers*

I. Homopolymers:

Polybutadiene-1,3 with at least 5% 1,4 structure.
Polyisoprene with at least 5% 1,4 structure.
Poly (conjugated diolefins).
Polyvinyl alkyl ethers.
Polyvinyl carboxylates, the carboxylates having 4 to 18 carbon atoms.
Poly alkyl acrylates, the alkyl group having 1 to 18 carbon atoms.
Poly alkyl methacrylates, the alkyl group having 5 to 18 carbon atoms.
Poly α-olefins, the α-olefins having 3 to 18 carbon atoms.
Poly p-alkyl styrenes, the alkyl group having 4 to 18 carbon atoms.
Aliphatic polyesters—amorphous type.
Aliphatic polyamides—amorphous type.
Aliphatic polyurethanes—amorphous type.
Polyalkylene sulfides—amorphous type.
Polyalkylene oxides—amorphous type.
Polysiloxanes.
Polyvinylidene chloride.
Polymers made from compounds containing a single olefinic double bond.
Poly(2,3-dimethylbutadiene-1,3) ("H" rubber or "W" rubber).

IIa. Interpolymers prepared by free radical emulsion polymerization of the following monomers in the ratios indicated:

|  | Approximate Composition for Stiffening Temperature of— | |
|---|---|---|
|  | −30° C. | 15° C. |
| Isoprene/styrene | 70/30 | 40/60 |
| Butadiene/styrene | 67/33 | 38/62 |
| Conjugated diolefin/styrene | (60/40) | (40/60) |
| Butadiene/acrylonitrile | 70/30 | 40/60 |
| Conjugated diolefin/vinyl-methyl ether | (30/70) |  |
| Conjugated diolefin/vinyl ethyl ether | (30/70) |  |
| Conjugated diolefin/propylene | (25/75) |  |
| Conjugated diolefin/butene-1 | (25/75) |  |
| Conjugated diolefin/methyl acrylate | (50/50) | (5/95) |
| Conjugated diolefin/ethyl acrylate | (30/70) |  |
| Conjugated diolefin/arylvinyl compound | (60/40) | (40/60) |
| Conjugated diolefin/methyl methacrylate | (60/40) | (40/60) |
| Conjugated diolefin/ethyl methacrylate | (65/35) | (35/65) |
| Conjugated diolefin/copolymerizable compound containing a single olefinic double bond |  |  |
| Conjugated diolefin/vinyl acetate | (70/30) | (30/70) |
| Conjugated diolefin/acrylonitrile | (70/30) | (40/60) |
| Conjugated diolefin/acrylic acid | (60/40) | (40/60) |
| Conjugated diolefin/methacrylic acid | (60/40) | (40/60) |
| Conjugated diolefin/vinyl chloride | (65/35) | (35/65) |
| Conjugated diolefin/vinylidene chloride | (25/75) |  |
| Conjugated diolefin/methacrylonitrile | (60/40) | (40/60) |
| Conjugated diolefin/vinyl pyridine | (60/40) | (40/60) |

(In the following terpolymers A+B=40 and C+D=60)

| | | |
|---|---|---|
| Conjugated diolefin/acrylonitrile (A or C)/methacrylic acid (B or D) | (60/A/B) | (40/C/D) |
| Conjugated diolefin/acrylonitrile (A or C)/acrylic acid (B or D) | (60/A/B) | (40/C/D) |
| Conjugated diolefin/styrene (A or C)/methacrylic acid (B or D) | (60/A/B) | (40/C/D) |
| Conjugated diolefin/styrene (A or C)/acrylic acid (B or D) | (60/A/B) | (40/C/D) |
| Conjugated diolefin (A or C)/isobutylene (B or D)/arylvinyl | (C/D/40) | (A/B/60) |
| Conjugated diolefin/vinylidene fluoride/chlorotrifluoroethylene |  |  |
| Conjugated diolefin/alkylacrylate/styrene |  |  |
| Alkylene oxide/3,3-bis(chloromethyl)oxatane | (85/15) | (15/85) |

IIb. Interpolymers:

|  | Approximate Composition for Stiffening Temperature of— | |
|---|---|---|
|  | −30° C. | 15° C. |
| Chlorosulfonated polyethylene of the "Hypalon" type |  |  |
| Aromatic-aliphatic copolyesters, copolyamides or copolyurethane |  |  |
| Aromatic-aliphatic copolyalkylene sulfides or oxides |  |  |
| Aliphatic-aromatic copolysiloxanes |  |  |
| Diisocyanate extended polyesters, polyamides, polydiols, or polyurethanes |  |  |
| Diamine or glycol extended reaction products of phosgene and a polyester, polydiol or polyamide |  |  | signifies that the proportions are even more variable and the exact proportions will depend on the exact nature of the copolymerizable monomer, such as the conjugated diolefin or alkylene oxide, used. The preferred conjugated diolefins are butadiene or isoprene. The dash signifies that the proportions are open even more variable depending on the choice of comonomers.

As has been mentioned before, it is essential that the blending of the two or more polymeric compositions may be done in such a manner as to produce a heterogeneous mixture. The heterogeneous character of the mixture insures the preservation of the most desired properties of each of the compositions being blended. Depending upon the particular components used in making the blend, heterogeneity may be achieved where each component is present as a phase separate from the other but in both instances continuous. Thus, it is conceivable that one phase would be continuously intermeshed or interwoven or intermingled with a continuous phase of the other component. Blends containing substantially equal parts of each component may be representative of such a phase relationship, i.e. where both the resinous component and the rubbery component are present as continuous phases.

Heterogeneous blends in which one component is the continuous phase and the other component is the discontinuous phase are more common when less than 40 parts of the component forming the discontinuous phase is used and more than 60 parts of the other component is used.

The heterogeneous character of the blend is produced by first forming a band of one of the components either the resin or the rubber on a mill and then adding the other component to this banded component cutting the band back and forth until the proper proportion of each is present and at the same time adjusting the temperature of the mill to the softening temperature of the composition having the highest softening point. Any other of the well known methods used for admixing two or more polymeric materials may be used in producing heterogeneous blends including blending of two or more different polymers in latex form where each polymer is relatively incompatible one to the other. When polymeric materials are being used which are relatively compatible to each other, then blending must be performed under more controlled conditions, for example mill blending is more desirable in that a limited amount of mixing may be brought about so that the separate components are inefficiently dispersed relative to each other.

The desirable properties of quiet and soft ride produced by a heterogeneous blend of two or more properly selected polymers may also be realized when the polymeric components are produced in accordance with well known "graft" or "block" polymerization techniques. For example, a composition having quiet and soft ride properties when used as the tread of a pneumatic tire may be made by polymerizing 55 parts of styrene and 45 parts of butadiene-1,3 in the presence of an emulsion of a rubbery copolymer of 76.5 parts of butadiene and 23.5 parts of styrene. This technique of grafting a 55/45 styrene/butadiene copolymer onto a backbone of a 75/25 butadiene/styrene copolymer is also applicable to other copolymerizable monomers when used in such amounts as to produce a graft portion having a stiffening temperature at least 20° different from the stiffening temperature of the backbone polymer. The chain length of the graft portion of the polymer or of the individual blocks of the block copolymer are to be of sufficient length and incompatible to each other, i.e. graft to backbone and block to adjacent block so as to approach the viscoelastic properties of a heterogeneous blend of separately prepared polymers corresponding to the graft and backbone portions of the graft polymer and to the block and adjacent block portions of the block polymer. Thus, the "graft" and "block" polymers have viscoelastic properties similar to the viscoelastic properties produced through the heterogeneous blending of at least two separately prepared polymers of proper stiffening temperature.

A pneumatic tire was made in accordance with Example 1 above and road tested with two other tires, one an SBR control tire and the other a butyl tire, each constructed in the same manner and tested under identical conditions. The pneumatic tire of the present invention is identified below as "soft ride tire," while the control tire is identified below as "SBR tire."

The SBR control tire is the conventional tire presently used today, the tread stock of which is made in a manner similar to that described above but using 125 parts of SBR-1705 (similar to SBR-1710 but containing 25 parts of an aromatic oil), 62.5 parts of carbon black (abrasive furnace black), and 10 parts of PM-100. The butyl tire, identified below as "butyl tire," is made with a tread stock of the following typical formula:

| | Parts |
|---|---|
| Butyl | 100.00 |
| Carbon black (abrasive furnace black) | 40.00 |
| Zinc oxide | 5.00 |
| Stearic acid | 1.00 |
| Processing oil (Necton 60, Penola Oil Company) | 5.00 |
| Tellurium diethyl dithiocarbamate (Tellurac) | 1.00 |
| Benzothiazyl disulfide (Altax) | 1.00 |
| Sulfur | 1.50 |

The following properties were measured:

*Ride quality*

An electronic vibration pick-up device was mounted on the axle of a motor car in such a manner that any accelerations in the axle transmitted thereto by the tire running over an uneven road surface are amplified and recorded. A test length of road surface is prepared by placing rubber strips on the surface of a smooth surface test road strip 25 feet apart and at right angles to the direction of travel of the wheels of the motor car and the motor car is then driven on the road and over these rubber strips at a speed of 15 miles per hour. Two types of rubber strips are used, one being ¾ inch high and two inches wide at the base, and the other being ½ inch high and two inches wide at the base. The tires being tested are inflated at 24 pounds per square inch measured at 72° F. The following quality rating based on the SBR tire as 100 was established for each of the three types of tires:

| | High Strips | Low Strips |
|---|---|---|
| SBR Control Tire | 100 | 100 |
| Soft Ride Tire | 105 | 110 |
| Butyl Tire | 106 | 102 |

It was observed that it was necessary to reduce the cold inflation pressure of the SBR control tire to 22.8 pounds in order to produce a ride quality equivalent to the soft ride tire when passing over the high strips at 15 miles per hour and 21.85 pounds when passing over the low strips, and 22.6 pounds in order to produce a ride quality equivalent to that produced by the butyl tire when riding over the high strips and 23.5 pounds when riding over the low strips. An over-all ride quality which is an arbitrary rating by test engineers under all road surface conditions, such as brick, expanded joints, concrete, asphalt, dirt, hard pan, and cobble stone, was determined and the following rating was obtained: Soft Ride Tire, 10; Butyl Tire, 10; SBR Tire, 1.

*Treadwear*

The treadwear was measured on each of the three test tires by running the motor car over an identical road surface and periodically measuring the amount of wear in accordance with well established methods over the distance traveled. The SBR control tire had a quality treadwear rating of 100 when measured at a fast rate, i.e. tread worn smooth in approximately 8,000 miles, while the soft ride tire had a rating of 71 and the butyl tire had a rating of 55. When rated at the slow wear rate, i.e. tread worn smooth at approximately 25,000 miles, the soft ride tire had a rating of 78 and the butyl tire had a rating of 65 in comparison to 100 for the SBR control tire.

*Road stability and response*

The following values are obtained by driving the motor car equipped with the particular test tires on the highway with the front tires inflated to a point which insures front end stability and the rear tires incrementally deflated until a non-stable condition is achieved. A rating as indicated below is made by the test engineer at each inflation pressure and the rating is based upon the "fish-tailing" effect noted by the test engineer as the motor car is moved sharply across the road and then back to the normal direction of travel.

| Stability and Response Rating | P.S.I. Cold Inflation Range Tested | | |
|---|---|---|---|
| | SBR Tire | Soft Ride Tire | Butyl Tire |
| Rigid | | | |
| Good+ | 28 | 28 | |
| Good− | | | |
| Med+ | 26 | 26 | 28 |
| Med− | 24 | 24 | 26 |
| Soft+ | 22 | 22 | 24 |
| Soft− | 20 | 20 | 22 |
| Unstable | 18 | 18 | 20 |

*Squeal*

Squeal is measured by driving the motor car on an 80-foot radius circle at various speeds. Two observers, one stationed on the inside and the other on the outside of the motor car, rate the squeal loudness and quality at the increments of speed noted below.

| | Miles per Hour to Audible Sound | Miles per Hour to Definite Squeal |
|---|---|---|
| SBR Tire | 18 | 22. |
| Soft Ride Tire | 23 | 27 (low growl). |
| Butyl Tire | 27 (low growl) | 27 (low growl).[1] |

[1] Squeal prevented by rapid abrasion observed by small balls of tread rubber remaining on the road surface.

*Skid rating*

The motor car equipped with a set of test tires is accelerated to about 28 miles per hour and is then decelerated. At 25 miles per hour automatic equipment initiates a mechanical counter operated from a trailing fifth wheel attached to the car. At 15 miles per hour the counter is disengaged. The point of disengagement is the distance used as a basis for comparison with an SBR test tire as the control. Ten runs are averaged for each tire for accuracy. The skid surface is of a smooth polished asphalt. The average efficient of friction is between 0.12 and 0.20. The following skid ratings were observed:

Rating based on distance required to decelerate from 25 m.p.h. to 15 m.p.h. with locked wheels—dry track

| | |
|---|---|
| SBR Tire | 100 |
| Soft Ride Tire | 91 |
| Butyl Tire | 94 |

*Gasoline consumption*

Gasoline consumption is measured in an obvious way by equipping the motor car with calibrated fuel tank, the fuel line of which is provided with a valve which can be used to switch from the main gasoline tank to the calibrated gasoline tank instantaneously. Before the test is initiated, the tires are run for 15 miles at a rated speed and at a given inflation in order to bring the temperature of the pneumatic tires to a constant level. After the warm-up run, the calibrated tank is turned on at a 0 mile marker on the road being used to test gasoline consumption and then turned off at the end of the test run. The test is repeated by driving the motor car in the opposite direction on the same strip of test road as a means of eliminating grade and wind effects. A constant speed is maintained throughout the test run. The following gasoline consumption values were obtained:

|  | Low Temperature | | High Temperature | |
|---|---|---|---|---|
|  | Rating | Temp., °F. | Rating | Temp., °F. |
| SBR Tire | 100 | 18 | 100 | 60 |
| Soft Ride Tire | 99 | 18 | 96 | 60 |
| Butyl Tire | 91 | 18 | 96 | 60 |

*Low temperature flat spotting*

The testing for flat spotting of the tire tread is made by permitting the motor car to remain stationary on a concrete surface for a period of 48 hours at an average temperature of −8° F. A test observer then drives the motor car at a constant speed of 15 miles per hour and determines how many miles of driving are required to run out the flat spot. A second method of determining flat spotting is one which is conducted in the laboratory in which the pneumatic tire provided with the test tread is statically pressed against the surface of a flywheel for a period of 48 hours at an average temperature of −8° F. using the same loading conditions on the pneumatic tires and the same inflation pressures as used when the tires were tested on the motor car. The total out-of-roundness is measured at 0 mileage and each mile thereafter as the flywheel is rotated in contact with the tire until a deflection of less than the detectable amount of 0.060 inch is reached. The following figures were obtained by both methods:

|  | Original Condition After 48 hrs. at −8° F. | Miles to Almost Gone | Miles to Gone |
|---|---|---|---|
| SBR Tire | Bad Flat Spot | 2.5 miles | 3.5+ |
| Soft Ride Tire | ---do--- | 1.8 miles | 3.0 |
| Butyl Tire | ---do--- | 5.0 miles | 6.0 |

Figure 9:
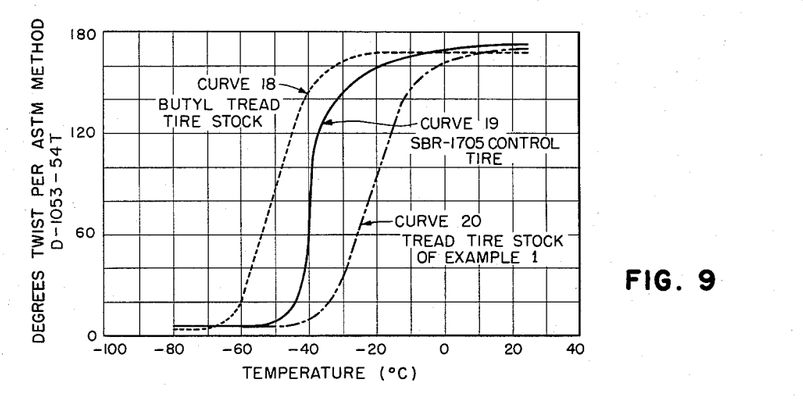

Each of the tread stocks used in the tires tested above were tested in accordance with the Gehman torsion method ASTM D 1053–54T and the results are found in FIG. 9 where curves 18, 19 and 20 represent the relative elastic properties of tread stock made of Butyl, SBR–1705, and a blend of this invention, respectively.

It has been shown that desirable soft and quiet ride is developed in a pneumatic tire having a tread of a blend of from 40 to 80 parts of rubber B intermixed with from 60 to 20 parts of rubber A as the necessary blend ratio. A more preferred range of rubber B to rubber A ratios is from 40/60 to 60/40 and still more preferred ratios are from 45/55 to 55/45. It is also important that the modulus of the composition be adjusted to approach low values. This may be done by adding an oily liquid especially of the type now used with rubbery materials for use in the contents of pneumatic tires. Specific examples of oily liquids include those used in making oil-extended rubber, such as mineral oil of the type used in the example above and other oily liquids compatible with at least one phase of the blend and preferably both phases.

Figure 10:
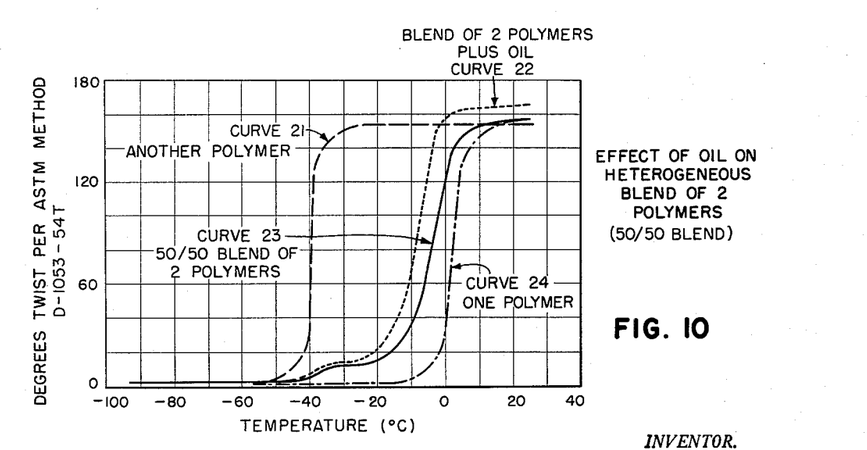

FIG. 10 shows curves 21, 22, 23, and 24 of which curves 21, 23, and 24 are similar to curves 13, 12, and 11, respectively, of FIG. 7. Curve 22 is the result of adding 25 parts of an oil known as Circosol 2XH to 100 parts of the 50/50 blend of the two heterogeneously blended polymers, curves 21 and 24, used in the gum stock represented by curve 23 of FIG. 10. Curve 22 shows that the addition of the oil lowers the stiffening temperature of that phase of the blend having the higher stiffening temperature. In addition, the shear modulus of the blend has been considerably reduced as noted by the upper nearly horizontal portion of curve 22 in the region of 20° C.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having improved riding qualities and comprising a tread portion and an open bellied hollow annular body terminating in spaced apart bead portions, at least the tread portion of which is made from a composition comprising a heterogeneous blend of (1) at least one rubbery polymeric material and (2) at least one polymeric material which is a polymer of at least one component selected from the group consisting of butadiene-1,3 and isoprene, the polymeric material (2) having a stiffening temperature not higher than 15° C. nor lower than about −30° C. and at least 20° C. higher than the stiffening temperature of at least one of said rubbery polymeric materials (1) and present in an amount of from about 40 parts to about 80 parts per 100 parts of total polymeric material present.

2. The pneumatic tire of claim 1 in which said rubbery polymeric material (1) is a rubbery copolymer of a hydrocarbon conjugated diene monomer and a vinyl aromatic monomer.

3. The pneumatic tire of claim 2 in which the hydrocarbon conjugated diene monomer is butadiene-1,3 present in an amount of from 60 to 99 parts and the vinyl aromatic monomer is styrene, present in an amount of from 40 parts to 1 part per 100 parts of total butadiene-1,3 and styrene monomer used in making the rubbery polymeric material (1).

4. The pneumatic tire of claim 2 of which said polymeric material (2) is a copolymer resulting from the polymerization of a mixture of butadiene-1,3 in an amount of from 38 parts to 68 parts and styrene in an amount of from 62 parts to 32 parts per 100 parts of total butadiene-1,3 and styrene monomer used in making said polymeric material (2).

5. The pneumatic tire of claim 4 in which said polymeric material (2) is a copolymer resulting from the polymerization of a mixture of 47 parts of butadiene-1,3 and 53 parts of styrene per 100 parts of total monomer present.

6. The pneumatic tire of claim 1 in which the polymeric material (2) is present in an amount of about 50 parts per 100 parts of total polymeric material present in the heterogeneous blend.

7. The pneumatic tire of claim 1 in which a rubber-compatible mineral oil is present in an amount of from about 10 parts to 100 parts per 100 parts of polymeric material in said heterogeneous blend.

8. The pneumatic tire of claim 1 at least the tread portion of which comprises a blend of about 50 parts of a rubbery polymeric material (1) made by polymerizing a mixture of 75% butadiene-1,3 and 25% styrene, and about 50 parts of a polymeric material (2) made by polymerizing a mixture of 53% styrene and 47% butadiene-1,3.

9. The pneumatic tire of claim 8 containing 40 to 45 parts of a mineral oil compatible with the polymeric materials of the heterogeneous blend.

10. The pneumatic tire of claim 1 in which the rubbery polymeric material (1) is a composition resulting from the polymerization of butadiene-1,3 under conditions to produce polybutadiene containing at least 75% cis-1,4 structure.

11. The pneumatic tire of claim 10 in which the rubbery polymeric material (1) is present in an amount of from about 50 parts to about 30 parts per 100 parts of total polymeric material present in the heterogeneous blend.

References Cited by the Examiner

UNITED STATES PATENTS 2,397,050   3/1946   Sarbach.

(Other references on following page)

UNITED STATES PATENTS

| | | |
|---|---|---|
| 2,541,748 | 2/1951 | Daly. |
| 2,560,031 | 7/1951 | Cline _______________ 260—894 |
| 2,661,339 | 12/1953 | Sparks et al. |
| 2,875,170 | 2/1959 | Ayers et al. _________ 260—45.5 |
| 2,896,949 | 7/1959 | Dunker _____________ 260—892 |
| 2,999,822 | 8/1961 | Pfau et al. __________ 260—892 |
| 3,012,000 | 12/1961 | Aries _______________ 260—892 |

OTHER REFERENCES

Borders et al.: "Industrial & Engineering Chemistry," vol. 38, September 1946, pages 955–958.

"Polysar Handbook," vol. 2, Polymer Corp. Ltd., Sarnia, Canada, 1960, pages 574, 677, 678, 679, 688, 691.

MORRIS LIEBMAN, *Primary Examiner*.

J. W. BEHRINGER, A. H. KOECKERT,
                        *Assistant Examiners*.